United States Patent

[11] 3,594,790

[72] Inventors Charles R. Laughlin
Silver Spring, Md.;
Roger C. Hollenbaugh, Chambersburg, Pa.
[21] Appl. No. 880,885
[22] Filed Nov. 28, 1969
Division of Ser. No. 701,744,
Jan. 30, 1968, Pat. No. 3,495,260
[45] Patented July 20, 1971
[73] Assignee The United States of America as represented by the Administrator of the National Aeronautics and Space Administration

[54] POSITION LOCATION SYSTEM AND METHOD
13 Claims, 1 Drawing Fig.
[52] U.S. Cl. .................................................... 343/6.8 R,
325/4, 343/6.5 R
[51] Int. Cl. ........................................................ G01s 9/56
[50] Field of Search ........................................... 343/100,
6.5, 6.8; 325/4, 17, 9, 10

[56] References Cited
UNITED STATES PATENTS
3,300,782  1/1967  Margerum et al. ............  325/4 X
3,305,864  2/1967  Ghose .............................  343/100 (SAT)
3,400,399  9/1968  Kline ..............................  343/6.5 UX Primary Examiner—Richard A. Farley
Assistant Examiner—Richard E. Berger
Attorneys—R. F. Kempf, E. Levy and G. T. McCoy ABSTRACT: Disclosed are a system and method for position locating, deriving centralized air traffic control data and communicating via voice and digital signals between a multiplicity of remote aircraft including supersonic transports and a central station, as well as a peripheral ground station (or stations), through a synchronous satellite relay station. Side tone ranging patterns, as well as the digital and voice signals, are modulated on a carrier transmitted from the central station and received on all of the supersonic transports. Each aircraft communicates with the ground stations via a different frequency multiplexed spectrum. Supersonic transport position is derived from a computer at the central station and supplied to a local air traffic controller. Position is determined in response to variable phase information imposed on the side tones at the aircrafts, with a plurality of different side tone techniques being employed, and relayed back to the transports. Common to all of the side tone techniques is Doppler compensation for the supersonic transport velocity.

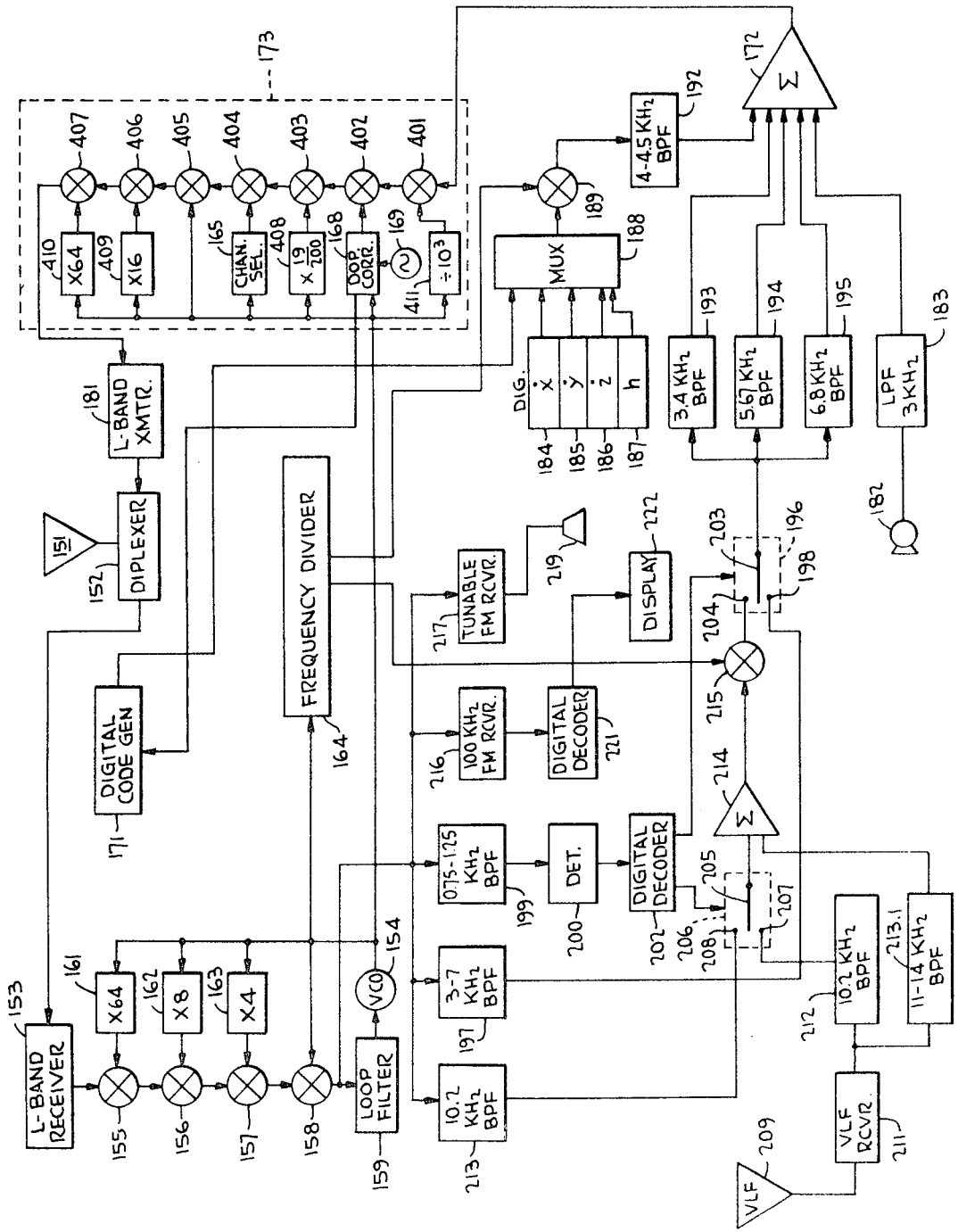

POSITION LOCATION SYSTEM AND METHOD

The present application is a division of Ser. No. 701,744 filed Jan. 30, 1968, now Pat. No. 3,495,260 for Position Location System and Method.

ORIGIN OF THE INVENTION

The invention described herein was made by employees of the United States Government and may be manufactured and used by or for the Government for governmental purposes without the payment of any royalties thereon or therefor.

The present invention relates generally to central air traffic control systems and method wherein the position of moving objects is determined with side tone ranging techniques and more particularly to a transceiver for relaying side tones modulated with positional information from an aircraft to a central station.

The development of the supersonic transport (SST), commercial aircraft capable of flying approximately 2,000 knots, results in aircraft location problems that do not generally exist in tracking subsonic aircraft traveling on the order of 600 knots. SST'x flying transoceanic routes must be constantly apprised of the exact location of other SST's in proximity thereto if lane corridors of approximately 100 miles, as are now standard in subsonic transoceanic aircraft traffic control, are to be utilized or reduced. The requirement for positional data regarding adjacent aircraft is even more necessary for an SST because such an aircraft flying at 2,000 knots has a 2 to 3 minute separation relative to another aircraft 100 miles away, in contrast to a 10 minute separation of aircrafts flying at 600 knots with the same displacement. Hence, with SST's there is a greater need for constant on board and centralized surveillance of adjacent aircraft to avoid midair collisions and mishaps than with transoceanic subsonic aircraft.

In accordance with the invention claimed in the copending application of Laughlin, Jr., et al. S.N. 701,679, now U.S. Pat. No. 3,534,367, filed Jan. 30, 1968, for Traffic Control System and Method, commonly assigned with the present application, the position of a vehicle, such as a transoceanic SST, is determined by a computer at a central ground location, supplied to a central air traffic controller having responsibility for that and adjacent aircraft, and transmitted to a number of adjacent vehicles in flight via a synchronous satellite positioned to relay signals between the vehicles and ground station. The position indicating signals returning from the aircraft are variable phase sidetones modulated on a carrier generally having a frequency in the microwave region.

Several alternate and/or complementary approaches may be utilized for determining the position of each aircraft by using the side tone ranging techniques disclosed and claimed in the Laughlin, Jr., et al. applications bearing Ser. Nos. 701,697 now U.S. Pat. No. 3,534,367 and 701,744 now U.S. Pat. No. 3,495,260 (both filed Jan. 30, 1968). In accordance with one technique, a very low frequency receiver is provided on each aircraft, which receiver is responsive to very low frequency, Omega emissions from a plurality of separated ground based transmitters. In response to the very low frequency signals received on the aircraft, the carrier transmitted thereby is modulated with data indicative of the aircraft position relative to the Omega transmitters. The central station responds to the modulation imposed on the aircraft carrier by the VLF signals received on the aircraft to indicate the aircraft position. Another general technique utilized for this sideband approach is described fully, except for Doppler compensation, in the copending application of Laughlin, Jr. et al., commonly assigned with the present application, filed on May 22, 1967, for Position Location and Data Collection System and Method and bearing Ser. No. 641,431, now U.S. Pat. No. 3,471,856.

According to a second technique utilized for measuring the position of an aircraft disclosed in the copending application of Laughlin, Jr. et al., S.N. 701,679, the intersection point of three spheres, defining lines of position or spherical loci about predetermined fixed points, is calculated at a ground station in response to signals emitted from each aircraft. One of these spheres is defined as the distance of the aircraft from the center of the earth, as derived from the aircraft altimeter, the reading of which is transmitted as a digital signal to the ground station via the link including the synchronous satellite. The radius of the second sphere is defined as the line of position, i.e. range, between the aircraft and synchronous satellite, determined in response to the phase of side tone modulation imposed on the microwave carrier transmitted between the satellite and aircraft. The radius of the third sphere is defined as a line of position around a very low frequency transmitter, such as an Omega transmitter, to which a very low frequency receiver on the aircraft is responsive.

The system utilizing a synchronous satellite as a fixed point requires only one very low frequency transmitter, and not a multiplicity of such transmitters as is employed by the technique relying upon Omega. Greater accuracy with the second system relative to Omega may also exist because the aircraft responds to the VLF transmitter closest or at the best geometrical location relative to the aircraft, whereby greater VLF signal-to-noise ratios or LOP intersection geometries are generally attained than with a system responsive to a plurality of relatively distant VLF transmitters. In addition, the satellite range can be determined more accurately with RF techniques than through VLF measurement, thereby decreasing one dimension of aircraft position error.

In accordance with the invention described and claimed in S.N. 701,744, now U.S. Pat. No. 3,495,260 the requirement for a ground based VLF transmitter is completely obviated by calculating the velocity vector of the aircraft relative to a synchronous satellite. In particular, the aircraft to satellite range rate, i.e. velocity vector, is derived from a coarse Doppler measurement made by the aircraft Doppler compensator, which measurement is transmitted back to the central station via a digital link. The exact aircraft carrier frequency is determined at the central station in response to the digital signal and a measurement of the aircraft carrier frequency relative to a standard at the central station. In addition, indications of the aircraft velocity vector relative to the earth, as derived from accelerometers on the aircraft, and the range between the aircraft and the synchronous satellite, as derived from side tone techniques imposed on a microwave carrier, are transmitted from the aircraft to the ground station via the synchronous satellite. In response to the aircraft velocity vector relative to the earth, the computer at the ground station calculates what the range rate between the aircraft and the satellite should be for every position on a line of position defined by the aircraft distance from the center of the earth and the distance between the aircraft and satellite. The calculated range rate is compared with the measured range rate for every point on the line of position. Equality between the calculated and actual range rate values yields an indication of the aircraft positions.

In accordance with the invention claimed herein there is provided a transceiver adapted to be carried on an aircraft utilizing the position detecting methods and apparatus disclosed in Ser. Nos. 701,744 now U.S. Pat. No. 3,495,260 and 701,679. The transceiver includes receiver and demodulator means responsive to the RF carrier for extracting the position indicating side tones. In addition, there is provided a phase locked loop for controlling the frequency transmitted from the transceiver in response to the received carrier so that phase coherence between the transmitted and received frequencies is maintained. Modulated on the transmitted carrier is a replica of the received side tones, as well as an altitude indicating signal. For systems utilizing velocity vector to indicate aircraft position, each aircraft is provided with inertial sensors other than an altimeter, such as integrating accelerometers, for deriving signals indicative of aircraft velocity in three mutually orthogonal directions. The velocity indicating signal modulate the coherent signal transmitted from the aircraft and enable aircraft position to be detected as the central station.

It is, accordingly, an object of the present invention is to provide a new and improved aircraft transceiver particularly adapted for utilization with aircraft position locating systems and methods.

Another object of the invention is to provide a new and improved transceiver providing phase coherence between transmitted and received signals.

A further object of the invention is to provide an aircraft transceiver wherein a transmitted signal in phase coherence with a received signal has modulated thereon signals enabling the aircraft position to be determined at a remote location.

An additional object of the invention is to provide a transceiver for extracting side tone modulation from a received signal and for transmitting a signal in phase coherence or phase locked with the received signal and modulated with the side tone.

The above and still further objects, features and advantages of the present invention will become apparent upon consideration of the detailed description of one specific embodiment thereof, wherein:

The drawing, as well as the brief and detailed descriptions of the drawing included with the application of Laughlin, Jr., et al., filed Jan. 30 1968, Ser. No. 701,744now U.S. Pat. No. 3,495,260 for Position Location System and Method, and commonly assigned with the present application, are incorporated herein by reference. Particular attention is directed to FIG. 9 of Ser. No. 701,744 now U.S. Pat. No. 3,495,260 and the description thereof beginning on column 15, line 2 and extending to column 18, line 53.

In the accompanying drawing, the single FIGURE corresponds to FIG. 9 of the above referenced patent.

We claim:

1. A transceiver for relaying back to a central station RF ranging side tones modulated on a carrier transmitted thereto from the central station and inertial data originating thereat comprising a phase locked loop for demodulating the carrier and deriving replicas of the tones, said loop including an oscillator responsive to the frequency and phase of the carrier transmitted to the station for controlling the frequency and phase of a carrier transmitted from the transceiver, altimeter means for deriving an altitude signal indicative of the distance of the transceiver from the center of the earth, and means for modulating said carrier transmitted from the transceiver with said altitude signal and the replicas of the tones.

2. The transceiver of claim 1 further including means for deriving signals indicative of the velocity of the transceiver relative to a point on earth, means for deriving a signal indicative of the Doppler shift frequency of the carrier received by the transceiver and means for coupling said signals indicative of velocity and Doppler shift frequency to said modulating means.

3. The transceiver of claim 1 further including means for compensating for Doppler frequency shift imposed on the carrier transmitted to and from the transceiver, said Doppler compensating means comprising: an oscillator deriving a variable frequency in response to the frequency of the received carrier, means for coupling the oscillator variable frequency to transmitter means for the carrier transmitted from the transceiver, means for measuring the Doppler shift frequency of the carrier transmitted to the transceiver, said coupling means including means responsive to the measured shift frequency for maintaining the carrier transmitted from the transceiver within a finite range defined as a predetermined Doppler shift frequency regardless of the Doppler shift frequency.

4. The transceiver of claim 1 further including means for deriving signals indicative of the velocity of the transceiver relative to a point on earth and means for coupling said signals indicative of velocity to said modulating means.

5. A transceiver for relaying back to a central station RF ranging side tones modulated on a carrier transmitted thereto from a central station and inertial data originating thereat comprising a phase locked loop for demodulating the carrier and deriving replicas of the tones, said loop including an oscillator responsive to the frequency and phase of the carrier transmitted to the station for controlling the frequency and phase of a carrier transmitted from the transceiver, means for deriving a velocity signal indicative of the velocity of the transceiver, and means for modulating said carrier transmitted from the transceiver with said velocity signal and the replicas of the tones.

6. The transceiver of claim 5 wherein said signal deriving means includes inertial means for deriving said velocity signal as being indicative of the velocity of the object relative to a point on earth.

7. The transceiver of claim 6 wherein said signal deriving means further includes altitude responsive means for deriving another signal indicative of the distance of the object from the center of the earth, said another signal modulating said carrier transmitted from the transceiver.

8. The transceiver of claim 5 wherein said signal deriving means includes Doppler shift frequency measuring means for deriving said velocity signal as being indicative of the velocity of the object relative to a point in space.

9. The transceiver of claim 5 wherein said signal deriving means further includes altitude responsive means for deriving another signal indicative of the distance of the object from the center of the earth, said another signal modulating said carrier transmitted from the transceiver.

10. The transceiver of claim 5 wherein said signal deriving means includes inertial and Doppler shift frequency measuring means for deriving said velocity signal as being indicative of the velocities of the object relative to a point on earth and a point in space.

11. A transceiver for relaying back to a central station RF side tones modulated on a carrier, $f_1$, transmitted thereto comprising a phase locked loop for demodulating the $f_1$ carrier and deriving replicas of the tones, said loop including an oscillator having its frequency and phase controlled in response to the frequency and phase of the $f_1$ carrier transmitted to the station, means responsive to said oscillator for controlling the frequency and phase of a carrier, $f_2$, transmitted from the transceiver, where $f_1$ is not equal to $f_2$, said controlling means controlling the frequency and phase of the $f_2$ carrier in response to the frequency and phase of $f_1$ as demodulated in the loop, said means for controlling further including means for heterodyning a replica of the oscillator output with a replica of the tones, whereby the $f_2$ carrier transmitted from the transceiver is modulated with replicas of the tones.

12. The transceiver of claim 11 further including an independent signal source, and means for mixing a replica of the oscillator output with the independent signal source.

13. The transceiver of claim 11 wherein said means for controlling further includes means for mixing the output of the heterodyning means with a replica of the oscillator output.